J. B. REPLOGLE.
MEASURING INSTRUMENT.
APPLICATION FILED NOV. 14, 1913.
1,171,646.
Patented Feb. 15, 1916.
2 SHEETS—SHEET 1.
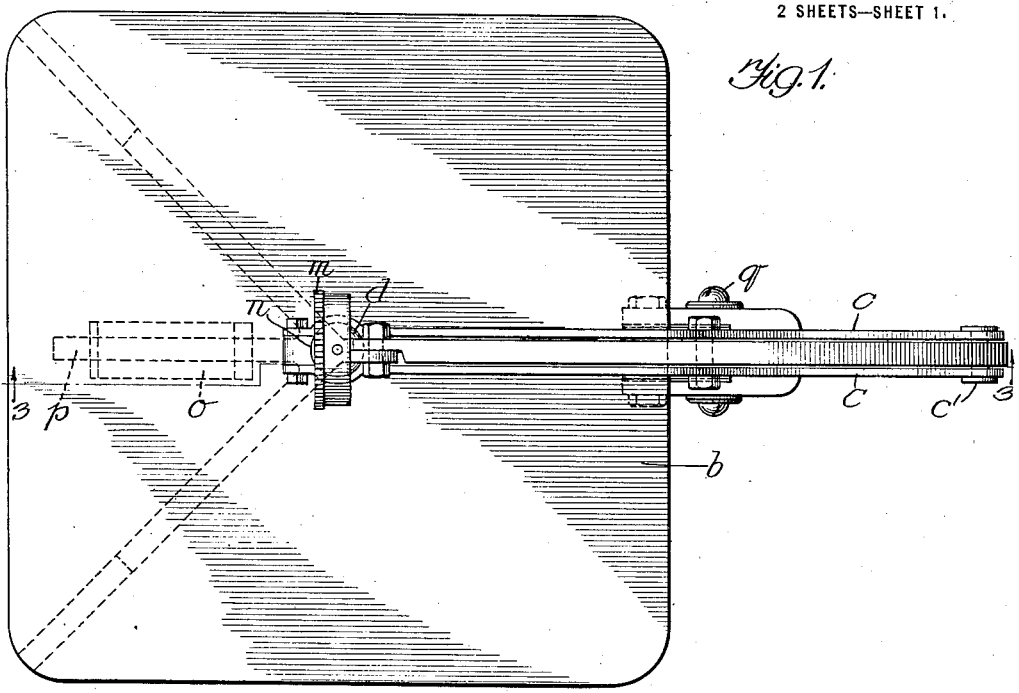
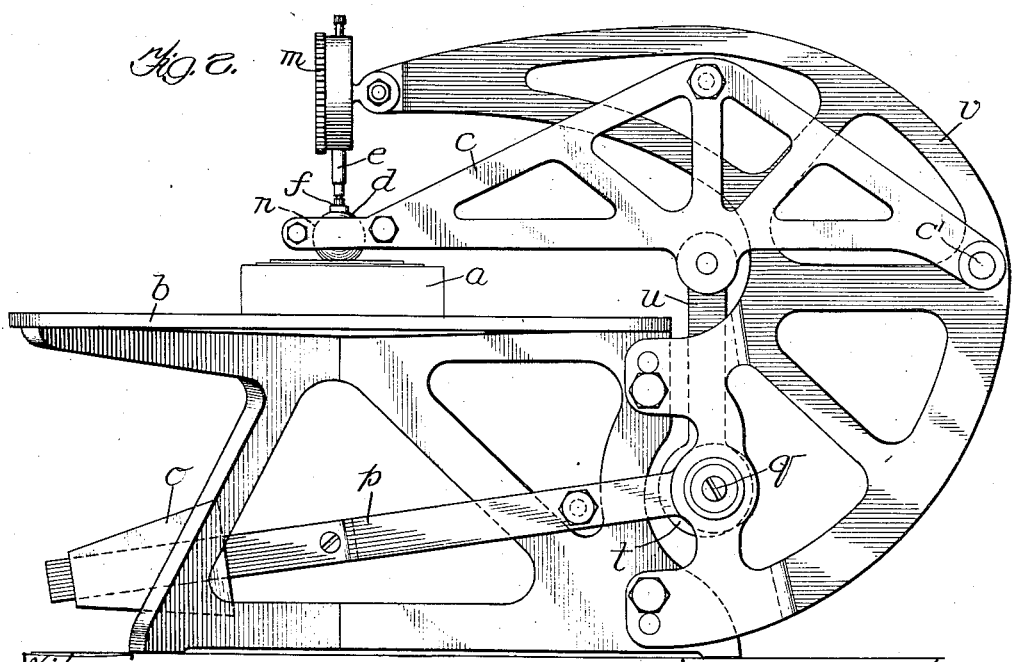

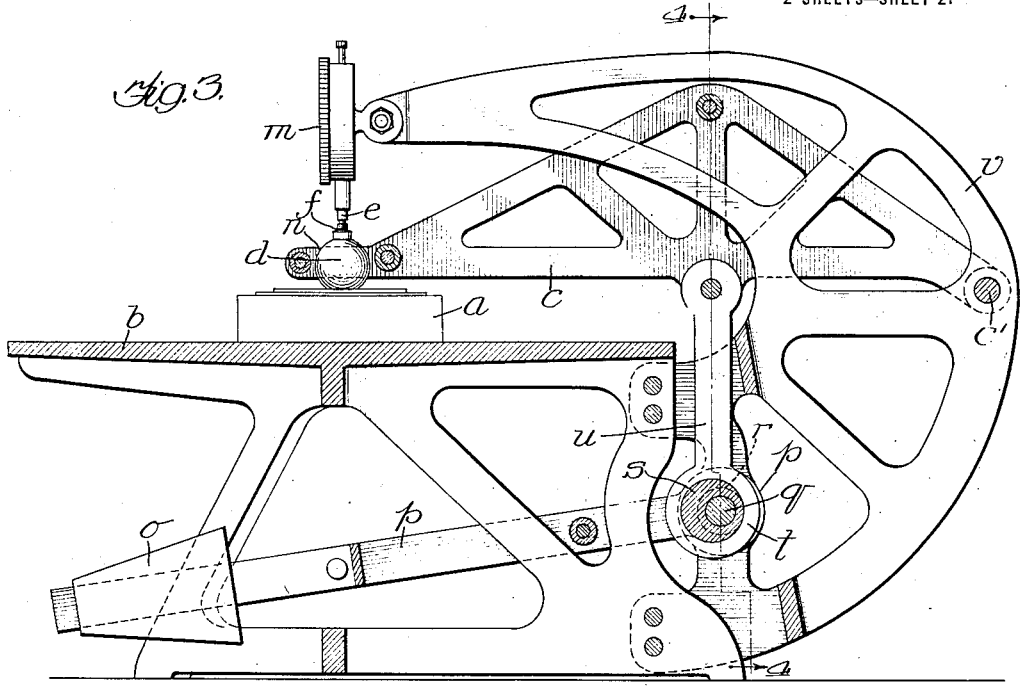
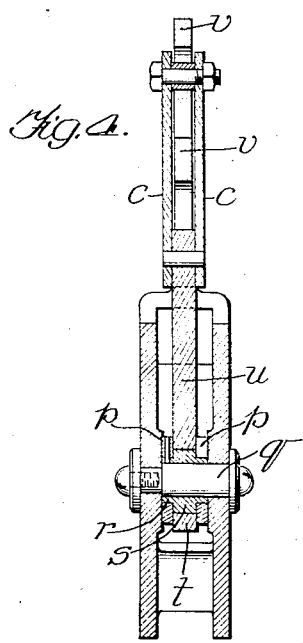
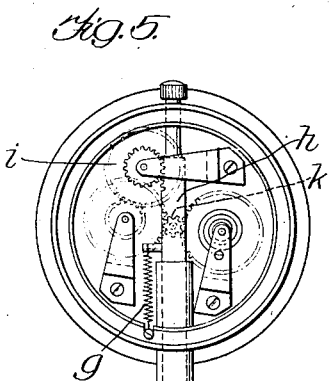
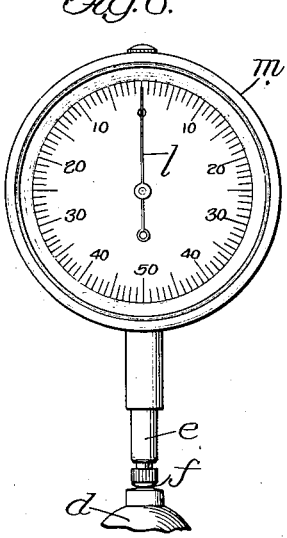
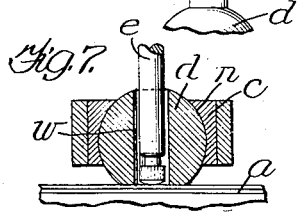

UNITED STATES PATENT OFFICE.

JAMES B. REPLOGLE, OF CHICAGO, ILLINOIS.

MEASURING INSTRUMENT.

1,171,646.      Specification of Letters Patent.      Patented Feb. 15, 1916.

Application filed November 14, 1913. Serial No. 800,916.

*To all whom it may concern:*

Be it known that I, JAMES B. REPLOGLE, a citizen of the United States, residing at Chicago, in the county of Cook and State of Illinois, have invented a certain new and useful Improvement in Measuring Instruments, of which the following is a full, clear, concise, and exact description, reference being had to the accompanying drawings, forming a part of this specification.

My invention relates to machines or devices for measuring the heights or thicknesses of objects and has for one of its purposes the provision of means whereby the heights or thicknesses of objects as modified by heavy working pressures may be indicated when such objects are absent from their normal working environment for the purpose of such measurement. To this end I employ a micrometric gage and associate the same with means for exerting that degree of heavy pressure upon that portion of the object being measured which such portion would receive in its actual working environment, the micrometric gage preferably having means for supplying a moving element thereof with an extremely light degree of pressure which is sufficient to maintain the gage in measuring relation to the object but which desirably has no material influence in causing the portion of the object being measured to assume the height which such object has in its working condition. The device of my invention thus becomes of peculiar service in comparing the working heights of printing plates and their mountings, which heights notably vary under working conditions as compared with their heights when not under working pressure.

The invention has other features and advantages and will be more fully explained by reference to the accompanying drawings showing the preferred embodiment thereof and in which—

Figure 1 is a plan view of the machine, certain parts being shown in dotted lines; Fig. 2 is a side elevation of the structure appearing in Fig. 1; Fig. 3 is a sectional elevation on line 3 3 of Fig. 1; Fig. 4 is a sectional view on line 4 4 of Fig. 3; Fig. 5 is a view illustrating the operating mechanism of one form of micrometric gage and a portion of a coöperating element; Fig. 6 is a front elevation of the gage and a portion of a coöperating element; and Fig. 7 is a view illustrating another form of a part of the mechanism.

Like parts are indicated by similar characters of reference throughout the different figures.

The object $a$ whose working height or thickness is to be determined is rested upon or engaged with a support or wall portion $b$ (Fig. 3). A follower support $c$ carries a follower or abutment $d$ for engaging the top or other opposing surface of the object $a$, the under and engaging face of this abutment being accurately planed to lay perfectly flat upon the top surface of the object $a$. The top surface of the support $b$ also presents a plane surface on which the object rests. The follower support $c$ is suitably mounted so that it may be lifted for the interposition of the object $a$ between the abutment $d$ and support $b$ and is preferably provided with means whereby the abutment $d$ will be automatically engaged with the top surface of the object $a$. The micrometric gage is of any suitable form, the gage illustrated, which is preferably mounted independently of the support $c$, being preferred, this gage including a vertically disposed plunger $e$ carrying an abutment $f$ and pressed downwardly by a light spring $g$ whereby this abutment $f$ will maintain contact with the top end of the abutment $d$ irrespective of the position of the element $d$. The upper portion of the plunger $e$ carries a rack $h$ which constitutes an actuating element of a multiplying train of gears $i$, the shaft of whose final pinion $k$ carries the indicating needle $l$. The gage dial is carried by a ring $m$ which may be turned to adjust the normal idle or initial position of the indicating needle $l$ with respect to the dial.

In using the device it is customary to compare the heights of the objects with a standard height, to which end an object of standard height is first interposed between and simultaneously engaged with the top of the support $b$ and the bottom face of the follower abutment $d$ whereafter the dial ring $m$ is adjusted to bring the zero mark of the dial scale into register with the indicating end of the indicator $l$. After the machine has thus been adjusted the object of standard height is removed to permit of the substitution therefor of objects whose heights are to be compared with the standard height. Owing to the light spring $g$ the follower $f$ will maintain engagement with the follower $d$ whose position corresponds to the height of the object being measured, the extent of the departure of the object from the standard height being indicated by the departure of the needle $l$ from its zero or normal position determined as above.

The scale divisions desirably represent each a thousandth of an inch, the multiplying gearing between the rack bar $h$ and the indicator $l$ permitting of the large scale subdivisions indicated (Fig. 6). For example, if the object whose height or thickness is being measured should lack five one thousandths of an inch of the standard height, the indicating needle $l$ (Fig. 6) will come to rest five scale divisions in a counter-clockwise direction from normal. If the height or thickness of the object being measured should exceed the standard height say ten one thousandths of an inch, the indicating needle $l$ will come to rest ten scale divisions in a clockwise direction from normal. The device of my invention may also be employed to measure the inequalities in the height of the object being measured, in which case it is desirable to maintain the lower surface of the follower $d$ in parallelism with the portion of the top surface of the object $a$ engaged thereby. This result may be accomplished by joining the follower $d$ with its support $c$ by means of a universal joint $n$ comprising the upper portion of the follower $d$ and a receiving socketed portion of the support $c$. The inequalities in the height of the object being measured are determined by successively interposing the different to-be-measured portions of the object between the abutment $d$ and the support $b$, to which end the abutment $d$ is preferably elevated prior to each measurement, this elevation being required for each successive measurement when the remaining characteristics of construction, illustrated, are employed.

I have thus far described an element $b$ (which constitutes a support when it is placed horizontal and which is in effect a wall portion against which the object whose height or thickness is to be measured is placed) a follower $d$ and a micrometric gage having a portion $f$ in constant engagement with this follower whereby such follower in effect becomes also a part of the micrometric gage, though direct mechanical union between the elements $d$ and $f$ is not required when the light spring $g$ is employed. It is obvious however that the invention would not be limited to a separable relation of the elements $d$ and $f$ nor to the employment of the spring $g$. In either event the part $d$ which has engagement with the face of the object $a$ opposite to that face of such object engaged by the wall $b$ should preferably be universally or flexibly mounted so that it may shift its position to enable its engaging face to have intimate contact with the face of the object $a$ engaged thereby. I have illustrated and thus far specifically described a device for measuring the thickness or height of plates or other objects having approximately flat faces, though it is obvious that objects having engaging surfaces of other form may be measured by devices embracing my invention.

The device of my invention is particularly well adapted to the measurement of the heights of printing plates and their mountings singly or combined whether used in flat bed or other types of presses and when the device is adapted to such or similar purposes the follower $d$ is desirably applied to the object being measured with a heavy pressure preferably substantially equal to the pressure to which such object is subject by an equivalent area of a coöperating part in the normal working environment of such object, whereby the height or thickness of the object and various portions of the object is taken as such height is modified by the working pressure to which such object is subject. To this end means are supplied, in addition to the micrometric gage, for furnishing the desired degree of heavy pressure with which the follower $d$ engages the object $a$. As the invention is embodied in the form shown in the drawings the means for furnishing the desired degree of heavy pressure is in the form of a weight $o$ (furnishing pressure comparatively very heavy with respect to the pressure furnished by the light spring $g$) upon the free end of a crank arm $p$ concentrically mounted upon the stationary shaft $q$. A weight is preferred for furnishing the heavy pressure since such pressure is uniform. The crank arm $p$ has two branches (Fig. 4) each in fixed relation with a rotatable sleeve $r$ having a bore coaxial with the shaft $q$. The intermediate portion $s$ of the sleeve $r$ is enlarged and has its circular periphery eccentric with respect to the shaft $q$ as illustrated most clearly in Fig. 3, this eccentric being thus in fixed angular relation to the crank arm $p$. The eccentric $s$ is surrounded by an eccentric strap $t$ at the lower end of a pitman $u$ whose upper end is connected with an intermediate portion of the support $c$ that is pivotally mounted upon the mounting bracket $v$ at $c^1$, this mounting bracket also carrying the micrometric gage at its forward upper end. When the crank arm $p$ is raised the eccentric will be shifted to raise the support $c$ and when the crank arm $p$ is lowered the support $c$ will be consequently lowered through the intermediation of the eccentric. The weight $o$, through the intermediation of the arm $p$, the pitman $u$ and the support $c$, presses the follower $d$ with the desired degree of heavy pressure upon the object $a$ being measured, whereby the particular portion of the object being measured is brought to the thickness or height it will assume in its working relation. Each time a new measurement is taken the forward end of the crank arm is lifted to permit of the desired positioning of the object or the portion of the object to be measured whereafter the arm $p$ is gently lowered until the follower $d$ rests upon the object $a$ whereupon the arm $p$ is released to permit the weight $o$ to engage the follower $d$ upon the object $a$ with the requisite pressure, the element $f$ of the micrometric gage following the movement of the element $d$, whether up or down, to bring the indicating needle $l$ to the height indicating position. It is necessary to lift the arm $p$ each time the object is to be repositioned or replaced since the pressure is so heavy as to prevent the object from being moved without injury to it when the weight $o$ is performing its function.

While the spring $g$ exerts a slight downward pressure upon the follower $d$ it is apparent that such pressure is ineffective for the purpose of my invention, pressure being required which is comparatively very heavy in its relation to the pressure furnished by said spring. For example, in the machine illustrated the heavy pressure furnished by the weight $o$ is one hundred pounds whereas the pressure furnished by the minute spring $g$ would not exceed an ounce.

In Fig. 7 a preferred form is shown in which the follower $f$ instead of resting upon the upper end of the follower $d$ passes through a channel $w$ in the follower $d$ so that the follower $f$ may rest directly upon the object $a$ to measure the height of this object after such height has been modified by the heavy pressure exerted at $d$.

While I have herein shown and particularly described the preferred embodiment of my invention I do not wish to be limited to the precise details of construction shown as changes may readily be made without departing from the spirit of my invention.

In the claims I use the term "working-like pressure" meaning thereby a pressure which will so modify the height or thickness of the object being measured that the measurement will indicate such thickness of the object when under working pressure in its working environment.

Having thus described my invention I claim as new and desire to secure by Letters Patent the following:—

1. A machine for measuring the working thickness of objects subject to heavy working pressure including an engaging element against which the object may be held; a universally mounted follower for engaging an opposite portion of the object being measured; means for applying heavy working-like pressure to the follower; and a micrometric gage having an actuating element provided with means for causing it to move toward the object as the object is depressed by the follower to measure the working height of the object.

2. A machine for measuring the working thickness of objects subject to heavy working pressure including an engaging element against which the object may be held; a universally mounted follower for engaging an opposite portion of the object being measured; means for applying heavy working-like pressure to the follower; and a micrometric gage having an actuating element provided with means for causing it to move with light pressure toward the object as the object is heavily depressed by the follower to measure the working height of the object.

In witness whereof, I hereunto subscribe my name this 12th day of November A. D., 1913.

JAMES B. REPLOGLE.

Witnesses:
G. L. CRAGG,
ETTA L. WHITE.